(12) United States Patent
Ascheuer et al.

(10) Patent No.: US 7,756,163 B2
(45) Date of Patent: Jul. 13, 2010

(54) METHOD AND SYSTEM FOR MULTI-CHANNEL DATA TRANSMISSION TO A PLURALITY OF SUBSCRIBERS IN A BLUETOOTH NETWORK

(75) Inventors: Peter Ascheuer, Düsseldorf (DE); Michael Warmers, Erkelenz (DE)

(73) Assignee: Infineon Technologies AG, Munich (DE)

( * ) Notice: Subject to any disclaimer, the term of this patent is extended or adjusted under 35 U.S.C. 154(b) by 1336 days.

(21) Appl. No.: 10/789,441

(22) Filed: Feb. 27, 2004

(65) Prior Publication Data
US 2004/0233879 A1 Nov. 25, 2004

(30) Foreign Application Priority Data
Feb. 28, 2003 (DE) ................. 103 08 947

(51) Int. Cl.
 *H04J 3/06* (2006.01)
(52) U.S. Cl. ....................... 370/503; 370/468
(58) Field of Classification Search .......... 370/310, 370/311, 343–349, 478, 503, 507–514, 314, 370/319, 321, 322, 324, 326, 336, 339, 431, 370/442, 449, 450, 464, 468, 470, 485, 491, 370/498, 500
See application file for complete search history.

(56) References Cited
U.S. PATENT DOCUMENTS

| | | | | |
|---|---|---|---|---|
| 6,574,266 B1 * | 6/2003 | Haartsen | ............... | 375/133 |
| 6,711,151 B1 * | 3/2004 | Ziegler | ............... | 370/350 |
| 6,748,195 B1 * | 6/2004 | Phillips | ............... | 455/41.2 |
| 6,757,318 B1 * | 6/2004 | Ziegler et al. | ............... | 375/133 |
| 6,839,393 B1 * | 1/2005 | Sidiropoulos | ............... | 375/371 |
| 6,901,057 B2 * | 5/2005 | Rune et al. | ............... | 370/310 |
| 6,975,613 B1 * | 12/2005 | Johansson | ............... | 370/338 |
| 7,023,833 B1 * | 4/2006 | Aiello et al. | ............... | 370/348 |

(Continued)

FOREIGN PATENT DOCUMENTS

| | | |
|---|---|---|
| DE | 10125342 | 12/2002 |
| WO | 0169861 | 12/2001 |
| WO | 02079796 | 10/2002 |

OTHER PUBLICATIONS

"Bluetooth technology and principle thereof", Telecommunication Journal, No. 2, 2002, pp. 17-20.

(Continued)

*Primary Examiner*—Steven H Nguyen
*Assistant Examiner*—Curtis A Alia (57) ABSTRACT

The invention relates to a method for data transmission, in particular on the basis of the Bluetooth standard, in which data packets can be interchanged by radio by means of a timeslot method, in which communication channels are set up between a master subscriber and at least one slave subscriber, at least two communication channels are operated with reduced activity in a first operating mode, such that the data interchange takes place periodically during first time slots which are then followed by second time slots during which no data interchange is intended, a first communication channel, which can be operated in the first operating mode, is synchronized to at least one second communication channel which can be operated in the first operating mode. The invention also relates to a data transmission system which operates on the basis of the Bluetooth method, in particular for carrying out the method according to the invention.

19 Claims, 11 Drawing Sheets

U.S. PATENT DOCUMENTS

| | | | |
|---|---|---|---|
| 7,035,235 B2* | 4/2006 | Jose | 370/330 |
| 7,042,863 B1* | 5/2006 | Morris | 370/338 |
| 7,046,644 B1* | 5/2006 | Lappetelainen | 370/329 |
| 7,242,905 B2* | 7/2007 | Kim | 455/41.2 |
| 7,292,588 B2* | 11/2007 | Milley et al. | 370/401 |
| 7,317,713 B2* | 1/2008 | Taniguchi | 370/345 |
| 2001/0002906 A1* | 6/2001 | Rune | 370/345 |
| 2002/0018458 A1* | 2/2002 | Aiello et al. | 370/348 |
| 2002/0018459 A1* | 2/2002 | Desblancs et al. | 370/350 |
| 2002/0034172 A1* | 3/2002 | Ho | 370/338 |
| 2002/0064134 A1* | 5/2002 | Lee et al. | 370/252 |
| 2002/0150147 A1* | 10/2002 | Liang | 375/133 |
| 2002/0167931 A1* | 11/2002 | Jang et al. | 370/348 |
| 2003/0026269 A1* | 2/2003 | Paryani | 370/401 |
| 2003/0031231 A1* | 2/2003 | You et al. | 375/133 |
| 2003/0036354 A1 | 2/2003 | Lee et al. | 455/41 |
| 2003/0081603 A1* | 5/2003 | Rune | 370/390 |
| 2003/0103487 A1* | 6/2003 | Kim et al. | 370/350 |
| 2003/0108008 A1* | 6/2003 | Agrawal et al. | 370/332 |
| 2004/0136350 A1 | 7/2004 | Warmers | |
| 2004/0147267 A1* | 7/2004 | Hill et al. | 455/456.1 |
| 2004/0165576 A1* | 8/2004 | Reunamaki | 370/350 |
| 2004/0176065 A1* | 9/2004 | Liu | 455/343.1 |
| 2004/0202125 A1* | 10/2004 | Sakamoto et al. | 370/331 |
| 2004/0204031 A1* | 10/2004 | Kardach et al. | 455/552.1 |
| 2005/0063372 A1* | 3/2005 | Jeong et al. | 370/376 |
| 2005/0107103 A1* | 5/2005 | Melpignano | 455/502 |
| 2005/0254525 A1* | 11/2005 | Diamond et al. | 370/503 |

OTHER PUBLICATIONS

English translation of Chinese First Office Action dated Nov. 28, 2008.

Specification of the Bluetooth System, Wireless Connections Made Easy, Version 1.1., vol. 1, Promoter Members of Bluetooth SIG, Inc., Feb. 22, 2001, pp. 1-1084.

* cited by examiner

FIG 1A

| M | k1 | S1 |
|---|---|---|
| 0x0000000 | SCO → | 0x0000000 |
| 0x0000002 |  | 0x0000002 |
| 0x0000004 | SCO → | 0x0000004 |
| 0x0000006 |  | 0x0000006 |
| 0x0000008 |  | 0x0000008 |
| 0x000000A | SCO → | 0x000000A |
| 0x000000C |  | 0x000000C |
| 0x000000E |  | 0x000000E |
| 0x0000010 | SCO → | 0x0000010 |
| 0x0000012 |  | 0x0000012 |
| 0x0000014 |  | 0x0000014 |
| 0x0000016 | SCO → | 0x0000016 |
| 0x0000018 |  | 0x0000018 |
| 0x000001A |  | 0x000001A |
| 0x000001C | SCO → | 0x000001C |
| 0x000001E |  | 0x000001E |

| S2 | k2 | M | k1 | S1 |
|---|---|---|---|---|
| 0x0000000 |  | 0x0000000 | Sniff → | 0x0000000 |
| 0x0000002 | ← Sniff | 0x0000002 |  | 0x0000002 |
| 0x0000004 |  | 0x0000004 |  | 0x0000004 |
| 0x0000006 |  | 0x0000006 |  | 0x0000006 |
| 0x0000008 |  | 0x0000008 |  | 0x0000008 |
| 0x000000A |  | 0x000000A |  | 0x000000A |
| 0x000000C |  | 0x000000C |  | 0x000000C |
| 0x000000E |  | 0x000000E |  | 0x000000E |
| 0x0000010 |  | 0x0000010 | Sniff | 0x0000010 |
| 0x0000012 |  | 0x0000012 | → | 0x0000012 |
| 0x0000014 | ← Sniff | 0x0000014 |  | 0x0000014 |
| 0x0000016 |  | 0x0000016 |  | 0x0000016 |
| 0x0000018 |  | 0x0000018 |  | 0x0000018 |
| 0x000001A |  | 0x000001A |  | 0x000001A |
| 0x000001C |  | 0x000001C |  | 0x000001C |
| 0x000001E |  | 0x000001E |  | 0x000001E |
| 0x0000020 |  | 0x0000020 |  | 0x0000020 |
| 0x0000022 |  | 0x0000022 |  | 0x0000022 |
| 0x0000024 |  | 0x0000024 | Sniff → | 0x0000024 |
| 0x0000026 | ← Sniff | 0x0000026 |  | 0x0000026 |
| 0x0000028 |  | 0x0000028 |  | 0x0000028 |
| 0x000002A |  | 0x000002A |  | 0x000002A |
| 0x000002C |  | 0x000002C |  | 0x000002C |
| 0x000002E |  | 0x000002E |  | 0x000002E |
| 0x0000030 |  | 0x0000030 |  | 0x0000030 |
| 0x0000032 |  | 0x0000032 |  | 0x0000032 |
| 0x0000034 |  | 0x0000034 | Sniff | 0x0000034 |
| 0x0000036 |  | 0x0000036 | → | 0x0000036 |
| 0x0000038 | ← Sniff | 0x0000038 |  | 0x0000038 |
| 0x000003A |  | 0x000003A |  | 0x000003A |
| 0x000003C |  | 0x000003C |  | 0x000003C |
| 0x000003E |  | 0x000003E |  | 0x000003E |

FIG 3

| M | k1 | S1 |
|---|---|---|
| 0x0000000 | Sniff → | 0x0000000 |
| 0x0000002 | | 0x0000002 |
| 0x0000004 | | 0x0000004 |
| 0x0000006 | | 0x0000006 |
| 0x0000008 | | 0x0000008 |
| 0x000000A | | 0x000000A |
| 0x000000C | Sniff → | 0x000000C |
| 0x000000E | | 0x000000E |
| 0x0000010 | | 0x0000010 |
| 0x0000012 | | 0x0000012 |
| 0x0000014 | | 0x0000014 |
| 0x0000016 | | 0x0000016 |
| 0x0000018 | Sniff → | 0x0000018 |
| 0x000001A | | 0x000001A |
| 0x000001C | | 0x000001C |
| 0x000001E | | 0x000001E |
| 0x0000020 | | 0x0000020 |
| 0x0000022 | | 0x0000022 |
| 0x0000024 | Sniff → | 0x0000024 |
| 0x0000026 | | 0x0000026 |
| 0x0000028 | | 0x0000028 |
| 0x000002A | | 0x000002A |
| 0x000002C | | 0x000002C |
| 0x000002E | | 0x000002E |
| 0x0000030 | Sniff → | 0x0000030 |
| 0x0000032 | | 0x0000032 |
| 0x0000034 | | 0x0000034 |
| 0x0000036 | | 0x0000036 |
| 0x0000038 | | 0x0000038 |
| 0x000003A | | 0x000003A |
| 0x000003C | Sniff → | 0x000003C |
| 0x000003E | | 0x000003E | tcurrent → 0x0000002 tnext → 0x000000C

FIG 4A

| S2 | k2 | M | k1 | S1 |
|---|---|---|---|---|
| 0x0000000 | | 0x0000000 | Sniff → | 0x0000000 |
| 0x0000002 | | 0x0000002 | | 0x0000002 |
| 0x0000004 | | 0x0000004 | | 0x0000004 |
| 0x0000006 | Sniff | 0x0000006 | | 0x0000006 |
| 0x0000008 | ← Sniff | 0x0000008 | | 0x0000008 |
| 0x000000A | | 0x000000A | | 0x000000A |
| 0x000000C | | 0x000000C | | 0x000000C |
| 0x000000E | | 0x000000E | | 0x000000E |
| 0x0000010 | | 0x0000010 | Sniff → | 0x0000010 |
| 0x0000012 | | 0x0000012 | | 0x0000012 |
| 0x0000014 | | 0x0000014 | | 0x0000014 |
| 0x0000016 | | 0x0000016 | | 0x0000016 |
| 0x0000018 | Sniff | 0x0000018 | | 0x0000018 |
| 0x000001A | ← Sniff | 0x000001A | | 0x000001A |
| 0x000001C | | 0x000001C | | 0x000001C |
| 0x000001E | | 0x000001E | | 0x000001E |
| 0x0000020 | | 0x0000020 | | 0x0000020 |
| 0x0000022 | | 0x0000022 | Sniff → | 0x0000022 |
| 0x0000024 | | 0x0000024 | | 0x0000024 |
| 0x0000026 | | 0x0000026 | | 0x0000026 |
| 0x0000028 | | 0x0000028 | | 0x0000028 |
| 0x000002A | Sniff | 0x000002A | | 0x000002A |
| 0x000002C | ← Sniff | 0x000002C | | 0x000002C |
| 0x000002E | | 0x000002E | | 0x000002E |
| 0x0000030 | | 0x0000030 | | 0x0000030 |
| 0x0000032 | | 0x0000032 | | 0x0000032 |
| 0x0000034 | | 0x0000034 | Sniff → | 0x0000034 |
| 0x0000036 | | 0x0000036 | | 0x0000036 |
| 0x0000038 | | 0x0000038 | | 0x0000038 |
| 0x000003A | | 0x000003A | | 0x000003A |
| 0x000003C | Sniff | 0x000003C | | 0x000003C |
| 0x000003E | ← Sniff | 0x000003E | | 0x000003E |

METHOD AND SYSTEM FOR MULTI-CHANNEL DATA TRANSMISSION TO A PLURALITY OF SUBSCRIBERS IN A BLUETOOTH NETWORK

FIELD OF THE INVENTION

The invention relates to a method for data transmission, in particular based on the Bluetooth standard, and to a data transmission system which operates on the basis of the Bluetooth method.

BACKGROUND

A communication system such as this is described, for example, in German Patent Application DE 101 25 342 A1.

The Bluetooth system is based on a communication standard which was recently developed and allows data transmission based on TDD (Time Division Duplex). The individual subscribers in this communication system define a communication network, a so-called piconetwork, within which the data packets to be transmitted are transmitted by radio and over a short distance.

One special feature of a Bluetooth communication system is that the subscribers which communicate with one another do not all have equal authorization. A Bluetooth communication system comprises one, and only one, master subscriber and at least one slave subscriber. The number of active slave subscribers, that is to say slave subscribers which are involved in the data interchange is typically limited to seven. In this case, the master subscriber acts as the control instance for the active slave subscribers.

Each subscriber (host) in the Bluetooth communication system has a transmission assembly (device). In the Bluetooth communication system, communication takes place between the host and the Bluetooth device via an interface, the so-called HCI interface (Host Controller Interface), which controls the data transmission via appropriate HCI commands.

The timeslot method is normally used for data transmission, with a Bluetooth communication channel having a bit rate of 1 Mbit/s, and a communication channel being subdivided into timeslots (slots) whose length is 625 μs. Two successive slots form a Bluetooth frame, whose length is 1250 μs. Only data from one transmitter (master or slave) may be transmitted in each timeslot, and an active slave subscriber can in this case transmit data in the form of data packets to the master subscriber only when it has already received a data packet from the master subscriber.

Each subscriber in the Bluetooth communication system has its own clock supply, with data communication being governed by the clock supply for the master subscriber. Each of the active slave subscribers attempts to receive the data packets which are intended for it and, if necessary, to respond to the master subscriber in those slots in which the master subscriber is transmitting.

A further special feature of the Bluetooth communications standard is that, in principle, there are two types of communication, a synchronous data link for transmission of speech data, and an asynchronous data link for pure data transmission. The synchronous data link is referred to in the Bluetooth system as an SCO link (Synchronous Connection Orientated link), and the asynchronous data link is referred to as an ACL link (Asynchronous Connection Less link). In the case of an ACL link, the amount of data which a slave subscriber can send back as the response to a data packet received from the master subscriber is limited such that it can send back only a single data packet in response to each received data packet.

There are three different data packets, which differ from one another in the information that they contain, for transmission of speech data using SCO links. The gross amount of data is the same in all data packets (240 bits). The net amount of data in each frame differs owing to the different codings and may be 80 bits, 160 bits and 240 bits. In order to make it possible to transmit the required amount of data bidirectionally, every frame must be allocated in the case of 80-bit data packets, every alternate frame must be allocated in the case of 160-bit data packets, and every third frame must be allocated in the case of 240-bit data packets.

The described SCO links and ACL links, which are operated in the sniff mode or in the park mode, are used by the master subscriber to periodically address the active slave subscribers, in each case using constant, very short repetition time intervals, and to fill the corresponding slots. This addressing process is also referred to in the following text as allocation. The sniff mode is an operating mode of a slave subscriber within a Bluetooth communication system with a reduced operating cycle, that is to say a state with reduced activity. In particular, the slave subscriber which is in the sniff mode is active only for a certain number of frames or slots within a fixed period. For the rest of the time, the slave subscriber is not involved in the communication in the Bluetooth communication system. Like the sniff mode, the park mode is likewise an operating mode with a reduced operating cycle. Furthermore, when the slave subscriber is in the park mode, it gives up its address, thus making it possible for the master subscriber to operate a far greater number of slave subscribers in the park mode via a separate access protocol, in contrast to the sniff mode or the active operating mode.

The park and sniff operating modes can be activated once an ACL link has been set up between the master subscriber and the slave subscriber. An ACL link which is in the active operating mode or in the sniff mode is used to set up and clear an SCO link.

Parameters are defined for the sniff operating mode and for the park operating mode which govern when the state with a reduced operating cycle may be assumed, and thus when the slave subscriber is in the active state. These parameters are the period T and the phase angle D within a sniff or park period. These parameters define the start and the interval of the respective data transmission. In addition, further parameters $N_{Attempt}$, $N_{Timeout}$ exist for the sniff mode, which determine the number of frames after the start of a respective period T during which the slave subscriber will actively participate in the data interchange within the communication system. Parameters T, d which govern how the speech processing is embedded in a frame grid likewise exist for an SCO link, in a comparable manner to the sniff operating mode and park operating mode.

An SCO link is set up and the sniff mode and park mode are started by synchronizing the link to the respective frame grid with the aid of the parameters which have been mentioned and using an appropriate initialization method.

An SCO link is set up, and the park or sniff mode is activated, in response to a command from the HCI interface, for example. The link master receives this command and controls its implementation. In a situation where an SCO link has been activated, the period T is also supplied in the HCI command. For the park and sniff operating modes, the corresponding HCI commands do not define any value for the period T. The HCI command provides only a lower limit and an upper limit for this period T, which must not be undershot or exceeded, respectively. The subscriber never defines any requirement for the phase angle D, so that the times at which allocation takes place are undefined, within the given degree of freedom.

The above description of a Bluetooth communication system has been described, for example, in the Bluetooth specification "The Specification of the Bluetooth System V1.1", 22 Feb. 2001. The content of this specification is also included in its entirety in the present patent application in particular with regard to the hardware-specific and software-specific configuration, the various types of link and the operating modes, as well as their parameters.

If a link to the master subscriber is now intended to be set up in addition to an already existing link between the master subscriber and a first slave subscriber for a second slave subscriber, then, in the situation where the first link is an SCO link or a link in the sniff or park mode, the link manager has a number of configuration options for setting up the second link, which it can select without contravening the various requirements which are defined by the subscriber by means of HCI commands. Degrees of freedom therefore exist for setting up a new link, although these are not used at the moment by the respective subscribers.

This problem will be explained in more detail in the following using two examples with reference to FIGS. 1 and 2:

EXAMPLE 1

Figure 1A:
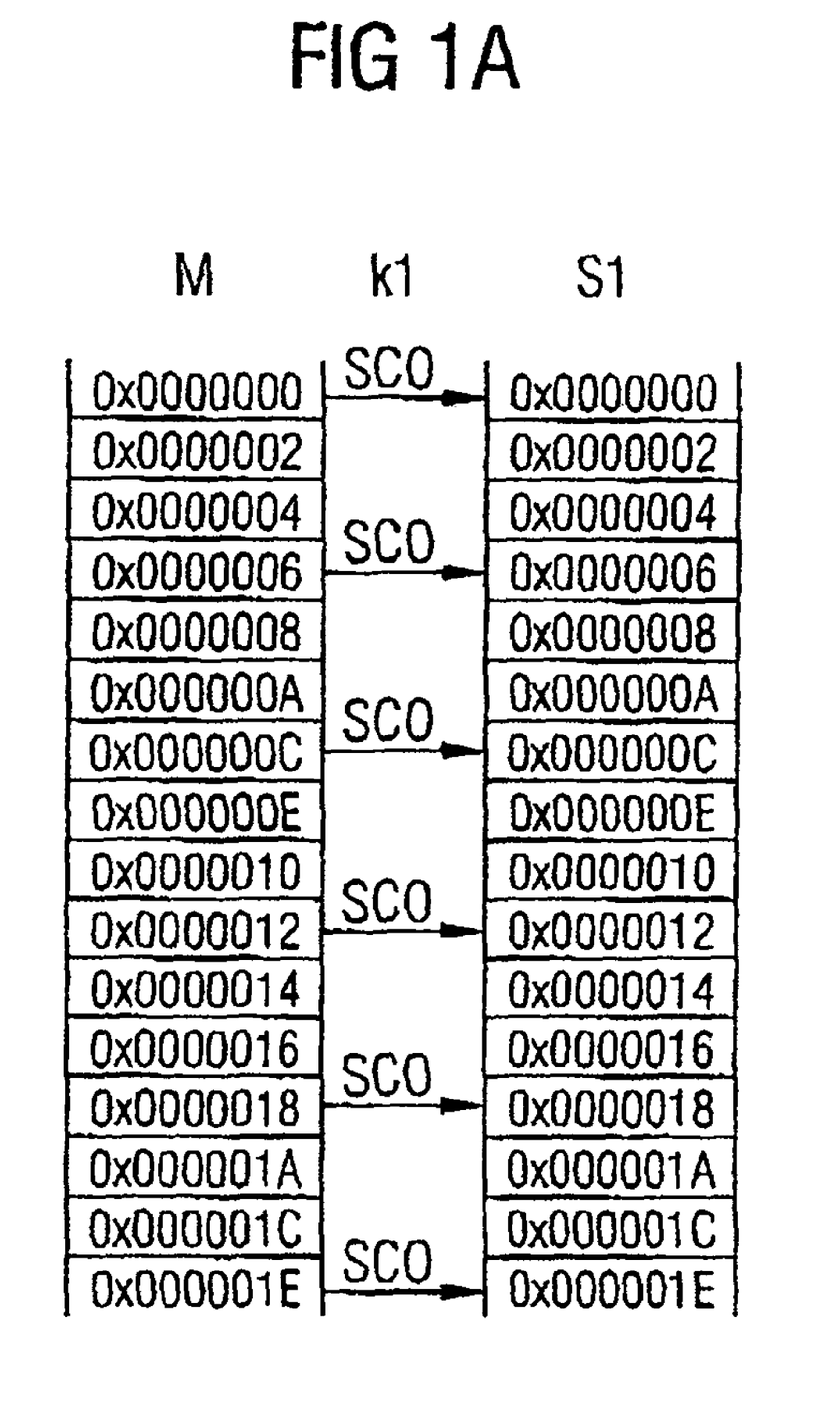
FIG. 1 shows a schematic illustration showing a first known form of timeslot data transmission between a master subscriber and two slave subscribers.

An SCO link K1 has already been initialized between the master subscriber M and the slave subscriber S1, with the sniff period (interval) being defined to be $T_{SCO}=6$ slots, and the phase angle being defined to be $D_{SCO}=0$ slots (see FIG. 1A). If a further link K2 is now intended to be set up to the slave subscriber S2 (which is assumed to be operated in the sniff mode) in addition to the already existing SCO link K1 between the master subscriber M and the slave subscriber S1, there are a number of options for the location of this second sniff link K2 relative to the first SCO link K1.

Figure 1B:
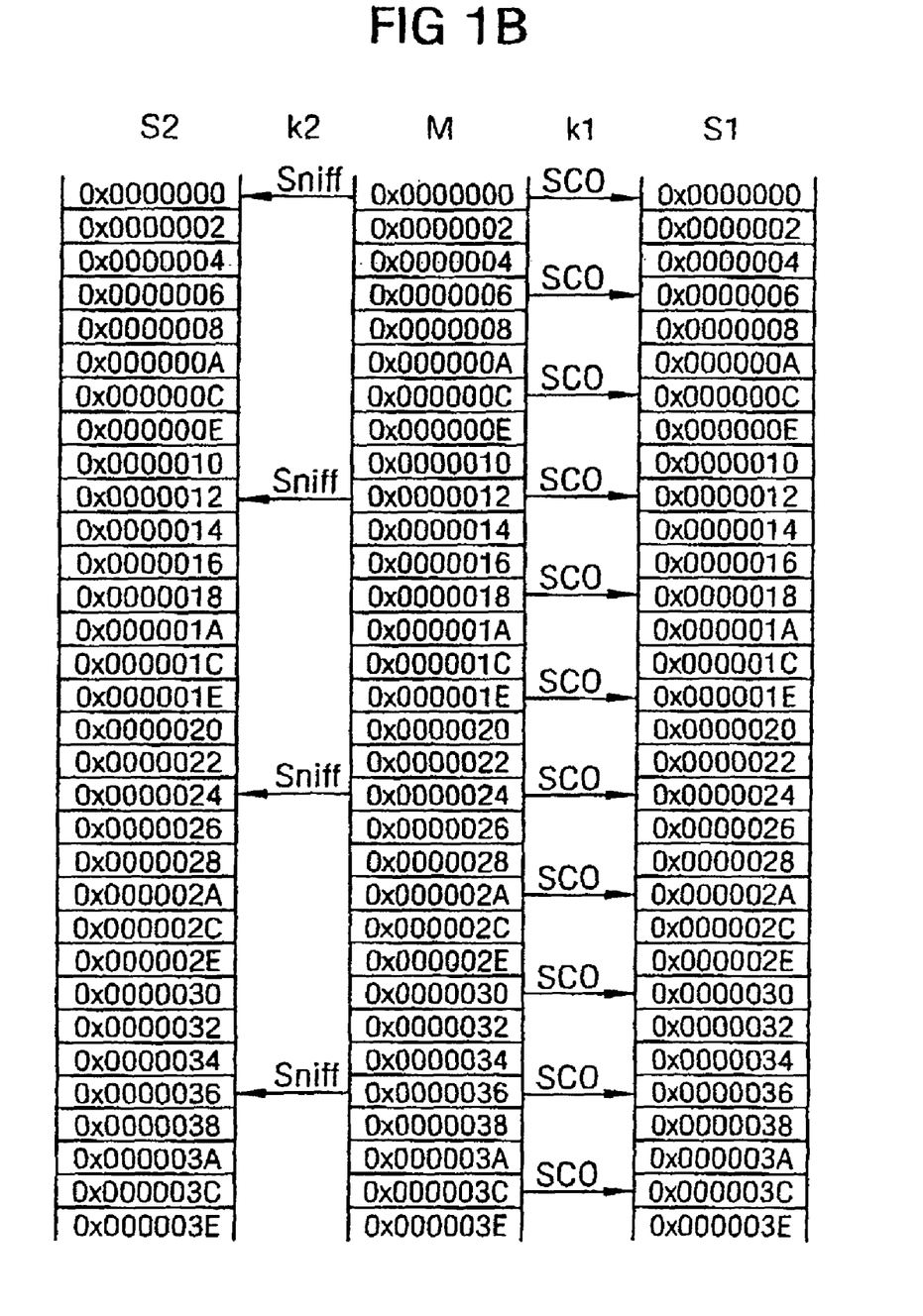
Figure 1C:
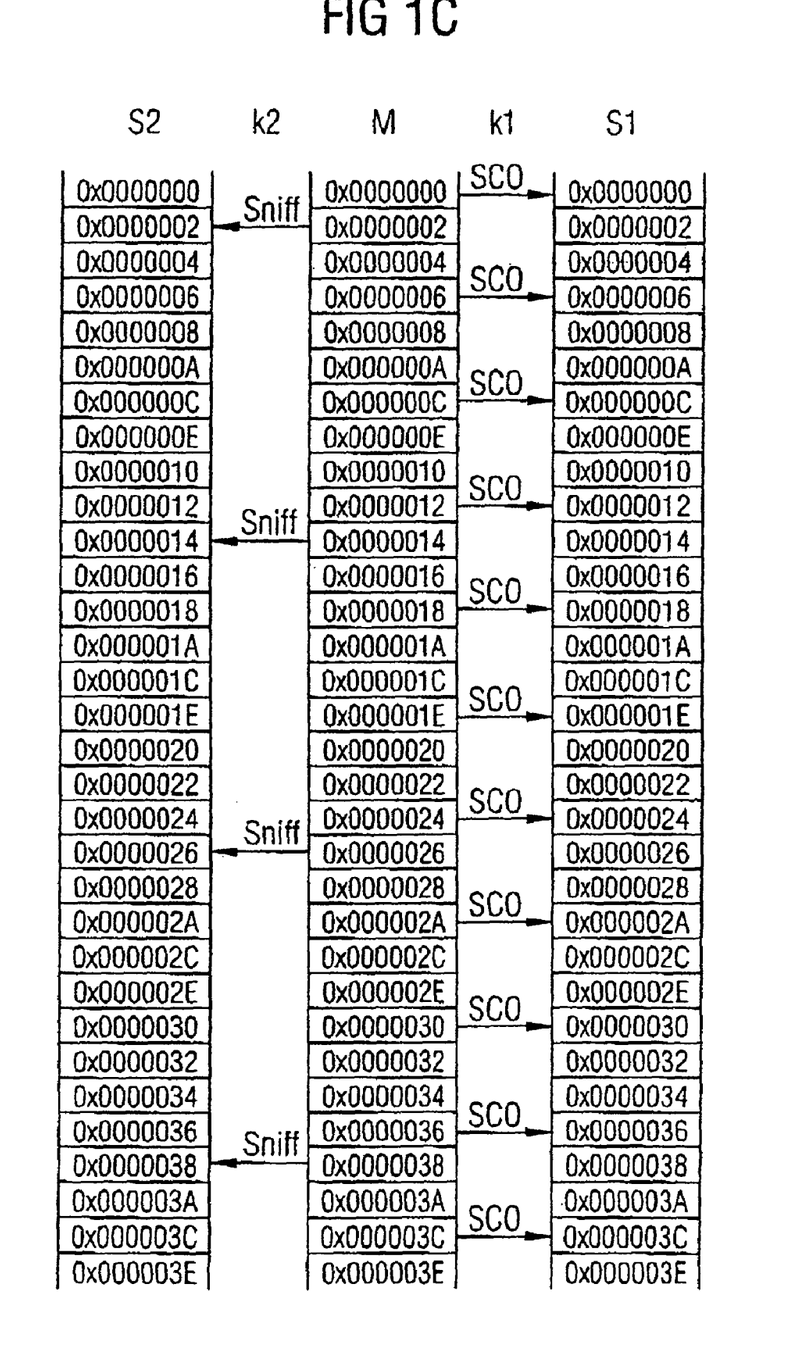

This is intended to be illustrated in FIGS. 1B and 1C, in which the sniff period has been defined to be $T_{Sniff}=18$ slots, $N_{Attempt}$ has been defined to be 1 slot, and $N_{Timeout}$ has been defined to be 0 slots. The subscriber S2 typically does not state any requirement for the choice of the phase angle $D_{Sniff}$. The phase angle $D_{Sniff}=0$ slots can thus be chosen according to the first alternative in FIG. 1B. As can be seen, with this configuration, all the frames which are allocated for the second link K2 in the sniff operating mode have already been allocated in the first SCO link K1. However, this configuration is generally not advantageous within the communication system.

The handling of an SCO link is always given priority over a sniff link on the basis of a priority structure which is specified for Bluetooth. However, this leads to the master subscriber M carrying out the data interchange via the SCO link while, in contrast, the data interchange via the sniff link does not take place until later or, as in the present case, does not take place at all. In practice, this is also referred to as a supervision timeout error, although this should as far as possible be avoided.

According to the second alternative in FIG. 1C, the phase angle was defined to be $D_{Sniff}=2$ slots. The active frames of the two slave subscribers S1, S2 are not superimposed for this configuration of the SCO link K1 and of the sniff operating mode.

Since the phase angle of the data interchange via the two communication channels K1, K2 is not defined, the two constellations mentioned above are equally probable, so that neither of them can be precluded.

EXAMPLE 2

A further problem occurs when it is intended to operate both of the communication channels K1, K2 to the two slave subscribers S1, S2 in the sniff operating mode. In this situation, there is no priority rule. This situation will be described in more detail with reference to FIG. 2.

Figure 2A:
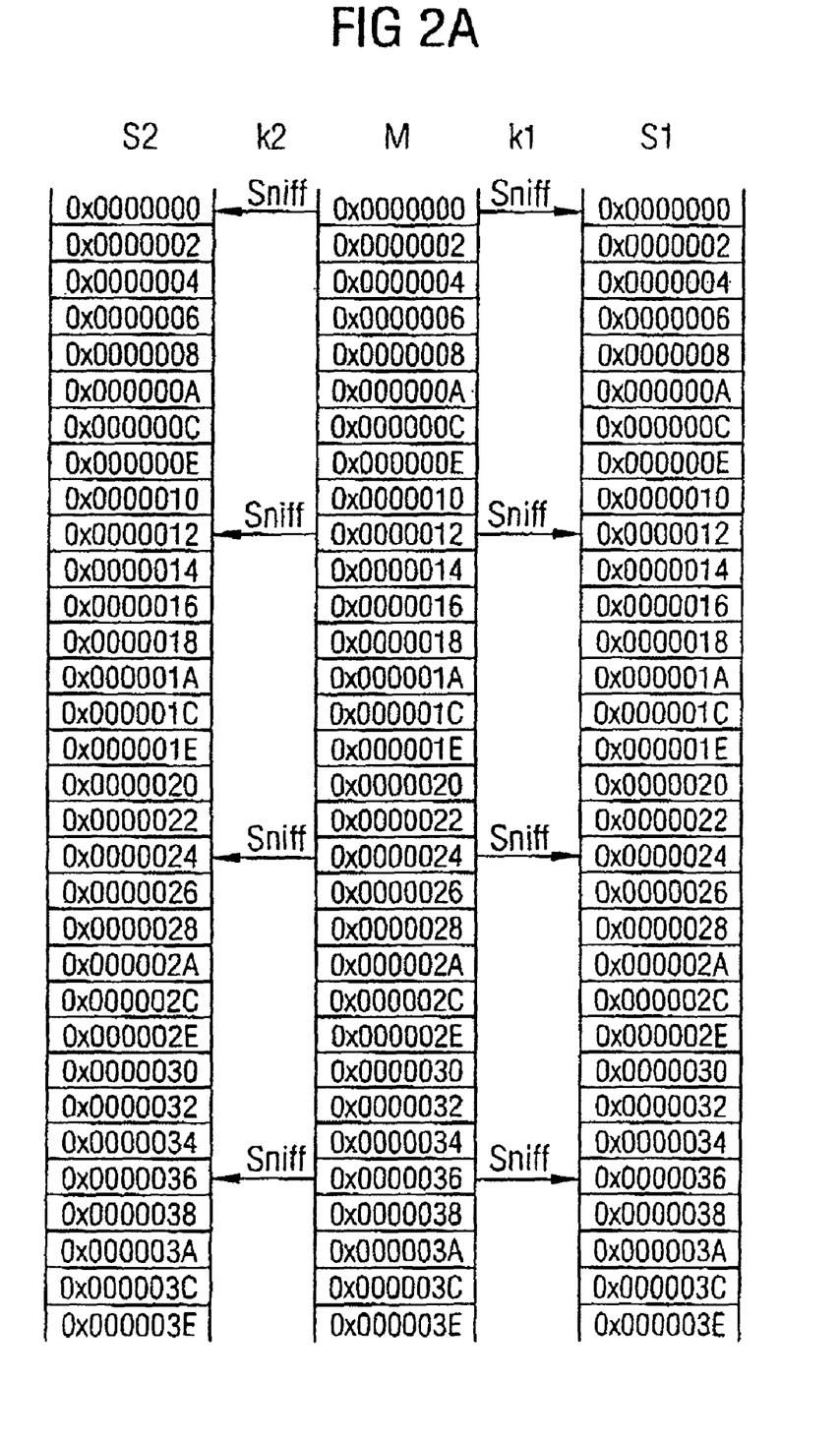
FIG. 2 shows a schematic illustration showing a second known form of timeslot data transmission between a master subscriber and two slave subscribers.
Figure 2B:
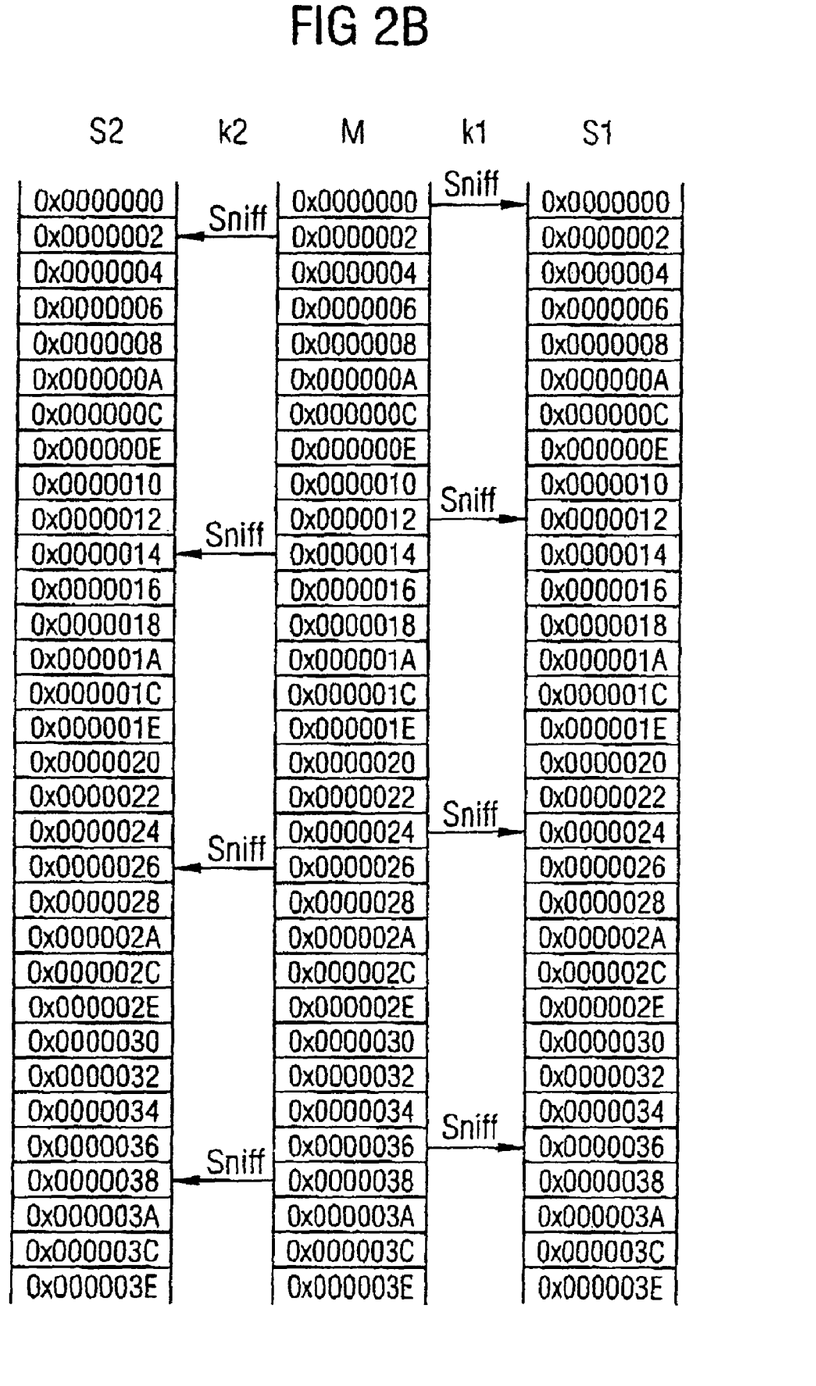

In the examples in FIGS. 2A and 2B, the sniff parameters are defined to be $T_{Sniff\ 1}=T_{Sniff\ 2}=18$ slots, $N_{Attempt\ 1}=N_{Attempt\ 2}=1$ slot, $N_{Timeout\ 1}=N_{Timeout\ 2}=0$ slots and $D_{Sniff\ 1}=0$ slots. The parameters with the indices 1 represent the respective parameters for the first link K1, which is operated in the sniff mode, and the parameters which are allocated with the index 2 represent those for the respective second link K2. The indices A and B denote the two alternative options in FIGS. 2A and 2B, where $D_{Sniff\ 2A}=0$ slots and $D_{Sniff\ 2B}=2$ slots.

Of these two alternative configurations, only one may be excluded as not being advisable. For certain applications, it may be advantageous for the active sniff frames to be superimposed corresponding to the example in FIG. 2A. In an alternative application as shown in FIG. 2B, it may also be advantageous for the link K2 to the slave subscriber S2 to be set up immediately following the allocation of the frame via the link K1 to the slave subscriber S1. In addition to these two alternatives, there are also a large number of further configuration options which could be chosen by the respective link manager without contravening the respective requirements as are defined by the respective subscriber via HCI commands.

However, one of these configuration options may be chosen more or less randomly, without any need to be concerned about the relationship between the phase of the new link and that of the already existing link. The degrees of freedom which are available for the allocation of the various links with respect to one another, particularly in the case of SCO links and in the case of links which are operated in the sniff mode or park mode, are therefore not used at the moment.

SUMMARY

The invention is therefore based on the object of specifying a method and a system, by means of which the degrees of freedom for setting up a further data link in the case of slot-based data transmission are utilized better. One aim in this case is, as far as possible, not to make use of an existing standard for data transmission.

An embodiment of the invention is a method for data transmission, in particular on the basis of the Bluetooth standard, in which data packets can be interchanged by radio by means of a timeslot method, in which:

communication channels are set up between a master subscriber and at least one slave subscriber, at least two communication channels are operated with reduced activity in a first operating mode, such that the data interchange takes place periodically during first time slots which are then followed by second time slots during which no data interchange is intended, a first communication channel, which can be operated in the first operative mode is synchronized to at least one second communication channel which can be operated in the first operating mode. (Patent claim 1)

Another embodiment according to the invention a data transmission system which is based on the Bluetooth standard, having a master subscriber, having at least one slave subscriber, in which case data packets can be interchanged by radio by means of a timeslot method in order to transmit data between the master subscriber and at least one slave subscriber, having a first communication channel for data interchange between the master subscriber and a first slave subscriber, having at least one second communication channel for data interchange between the master subscriber and at least one second slave subscriber, having means for synchronization of the first communication channel to at least the second communication channel. (Patent 12)

Advantageous refinements and developments of the invention can be found in the dependent claims and in the description, with reference to the drawings.

One precondition for the use of the method according to the invention is the existence of a link and/or of an operating mode for a link with a reduced operating cycle.

The method according to the invention makes it possible to deliberately, and thus better, utilize the data interchange degrees of freedom which are inherent in the communication system. This is achieved by an extension to the interface between the user or the link manager and the subscribers which are involved in the data interchange.

The general idea of the invention is to automatically synchronize the data interchange between specific subscribers. In this context, the expression synchronization should be understood as meaning that the data communication takes place via a channel between two subscribers at times which are known to them both. These subscribers have a link to the master subscriber and are operated in an operating mode in which data is interchanged with a reduced operating cycle, that is to say data interchange takes place for specific timeslots, after which there are further timeslots in which no data interchange takes place. One example of a link such as this in the case of a Bluetooth communication system is an SCO link or a link which is operated in the park mode or sniff mode.

If this data communication were to be extended by a further channel then it would be possible to deliberately select a period and to deliberately select a phase for this channel as a function of the period and the phase of the first channel, thus making it possible to quite deliberately relate timeslots in the two channels to one another. For the purposes of the present invention, this deliberate choice of the phase and period of the two channels is regarded as active synchronization.

If it is found that synchronization of the respective operating modes in the various channels is desired, then an additional parameter can be used to define whether the respective active frames in the relevant operating modes should be superimposed, whether they should be directly adjacent, or at what specific position within the frame grid they should be arranged. This is achieved by adding a separation parameter δ to the already known parameters.

This addition to the already existing parameters is advantageously achieved without any extension to the already existing communication standard, in particular the Bluetooth standard. Thus, in addition to the standardized interface, each manufacturer may define manufacturer-specific HCI commands which, of course, are then also understood only within that manufacturer's own systems.

However, the invention may also be used when the master subscriber is one specific system and the respective slave subscribers are other systems, or belong to them.

The particular advantage of the method according to the invention is that the degrees of freedom for data communication may be used as required on a user-specific basis. This allows power saving measures for data communication to be implemented in a very simple and elegant manner. The allocation of adjacent frames makes it possible to implement current saving measures in the other frames in a very elegant manner.

Furthermore, in comparison to conventional methods, the number of frames which are reserved for interchanging data can be reduced in a very simple manner, and this once again leads to a power consumption saving and to more efficient use of the available bandwidth.

One critical parameter for the method according to the invention is the choice of the period T, which may in fact be different for the various operating modes mentioned above. Only three different periods $T_{SCO} \in \{2, 4, 6\}$ slots are defined for SCO links. However, an SCO link with $T_{SCO}=2$ slots is irrelevant for the method according to the invention since, in this operating mode, all of the slots are already used for data interchange, that is to say only allocated frames exist in this case.

In one advantageous refinement, links which are operated in the park or sniff mode and which have to be synchronized to an SCO link have a multiple of the smallest common multiple of the SCO period, that is to say $T_{SCO}=4$ slots and $T_{SCO}=6$ slots. This allows there to be a fixed phase angle between the frames which are required for the SCO mode and the frames which are operated in the sniff mode or park mode.

In one advantageous refinement, the sniff mode and park mode can also be synchronized to one another. The respective periods $T_{Sniff}$ and $T_{Park}$ are either the same or are multiples of one another, for this purpose.

In one particularly advantageous refinement, the separation parameter δ may be set such that the at least two different links are synchronized to one another in such a way that adjacent timeslots are in each case allocated.

In an alternative, likewise advantageous refinement, the various links can be synchronized in such a way that the allocated timeslots in the at least two links overlap.

During initialization of a communication link, the initialization methods have a discontinuous response from the maximum value to zero during the transition of the CLK system clock (CLK master clock). These discontinuities can be corrected in a known manner by suitable choice of the respective phase angle for this communication link. According to the invention, the number of zero crossings which have occurred since a communication channel was set up are counted for synchronization. The phase angle for a further communication channel can now be determined from the number of zero crossings, with this further communication channel being synchronized to the first-mentioned communication channel in a desirable manner.

In one refinement, the data interchange between the master subscriber and a slave subscriber is slot-based or frame-based, as is normally the case for data communication based on the Bluetooth standard.

In one refinement, the master subscriber acts as the master and at least one of the slave subscribers as the slave. A maximum of seven slave subscribers acting as slaves are typically actively involved in the data interchange. In this case, the data may also be transmitted from the master subscriber to the same slave subscriber via two or more communication channels.

In one refinement, the data transmission system is implemented in systems for cordless data communication, such as digitally operated cordless telephone systems. Additionally or alternatively, the invention can also highly advantageously be used in programmable computer systems or their peripherals, although the invention is not restricted to this application.

In one refinement of the invention, a control device is provided, and is used to set up the communication channels. This control device also controls the timing of the data interchange and defines the parameters for the data communication. In one refinement of the invention, the means for synchronization are implemented in the link manager. Alternatively, they may also be implemented in Bluetooth baseband.

In one refinement of the invention, a programmable unit, in particular a microprocessor or microcontroller, is provided for determination of the synchronization parameter and/or for controlling the data interchange and the setting up of a communication channel.

The invention will be explained in more detail in the following text with reference to the exemplary embodiments which are illustrated in the figures of the drawings, in which:

DETAILED DESCRIPTION

Identical or functionally identical elements and signals are identified in the same way—unless stated to the contrary—in all of the figures of the drawings.

In order to assist clarity, the frame grids in FIGS. 1 to 5 all show only those slots in which transmission is taking place from a master subscriber to the respective slave subscribers, that is to say the opposite situation (odd number of slots) has in each case been omitted. Furthermore, the CLK system clock within the individual slots is illustrated in hexadecimal form, starting with a "0x".

One precondition for the use of the method according to the invention is the existence of a first link which is being operated in the sniff mode or park mode, or an SCO link. The second link can then be configured in a similar manner, with the following text describing one preferred solution approach on the basis of a second link in the sniff mode, without any restriction to generality. According to the invention, this second link in the sniff mode is intended to be synchronized to the frame grid with defined timing with respect to the already existing first link.

Figure 3:
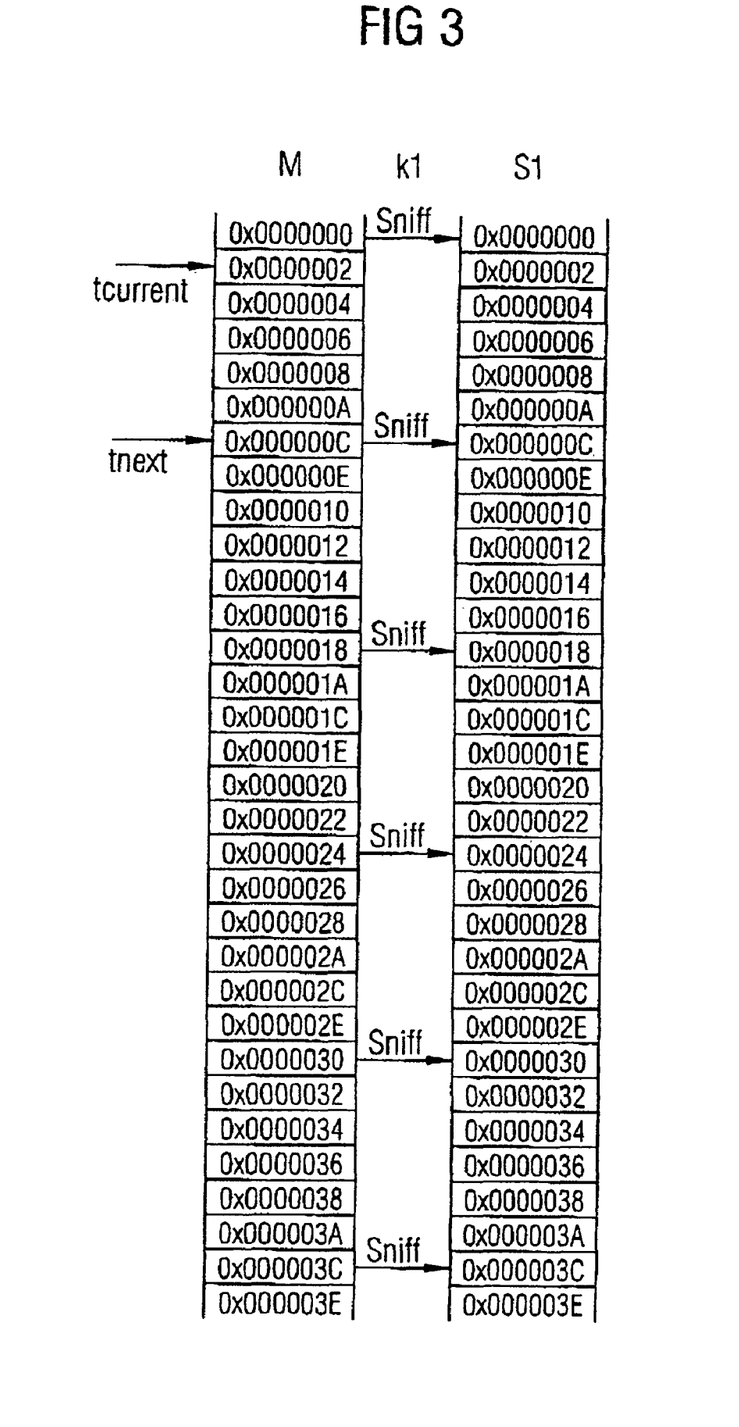
FIG. 3 shows a schematic illustration of a frame grid in order to show the method according to the invention.

FIG. 3 shows a schematic illustration for a frame grid in which a first link K1 already exists between the master subscriber M and a slave subscriber S1 in the sniff mode. The sniff mode parameters are in this case defined to be $T_{Sniff}=12$ slots and $D_{Sniff}=0$ slots. At least one further link K2 is intended to be synchronized to the frame grid relative to this already existing link. The procedure for this synchronization process will be described in more detail with reference to FIG. 3.

The current time is assumed to be $t=0x0000002$ slots. The second link is likewise intended to be operated in the sniff mode, and is intended to have the same period $T_{Sniff}=12$ slots. A further boundary condition is that this second link K2 is intended to be immediately adjacent to the first link K1, that is to say the desired separation $\delta$ between the two links is $\delta=2$ slots. The time $t_{Sync}=t_{Next}+\delta$ is now determined as the synchronization time $t_{Sync}$ for the second link. Thus, starting from the current time, the next slot is looked for which is associated with the first link K1 in the sniff mode. In the example in FIG. 3, this is the slot at the time $t_{Next}=0x000000C$ slots, and this results in $t_{Sync}=0x000000E$.

The time $t_{Sync}$ determined in this way is used (with the initialization methods that are used) to synchronize a second link to the first link K1. A value of the phase angle for the second link in the sniff mode which satisfies the desired requirements can now be determined, with the given period $T_{Sniff}$, by means of one of the available initialization methods. In the present case, this phase angle is: $D_{Sniff}=\delta=2$ slots.

Furthermore, of course, a number of additional configuration options may, of course, also be provided by suitable choice of the parameter $\delta$ and thus of the synchronization parameter $t_{Sync}$ within the respective degrees of freedom.

Figure 4A:
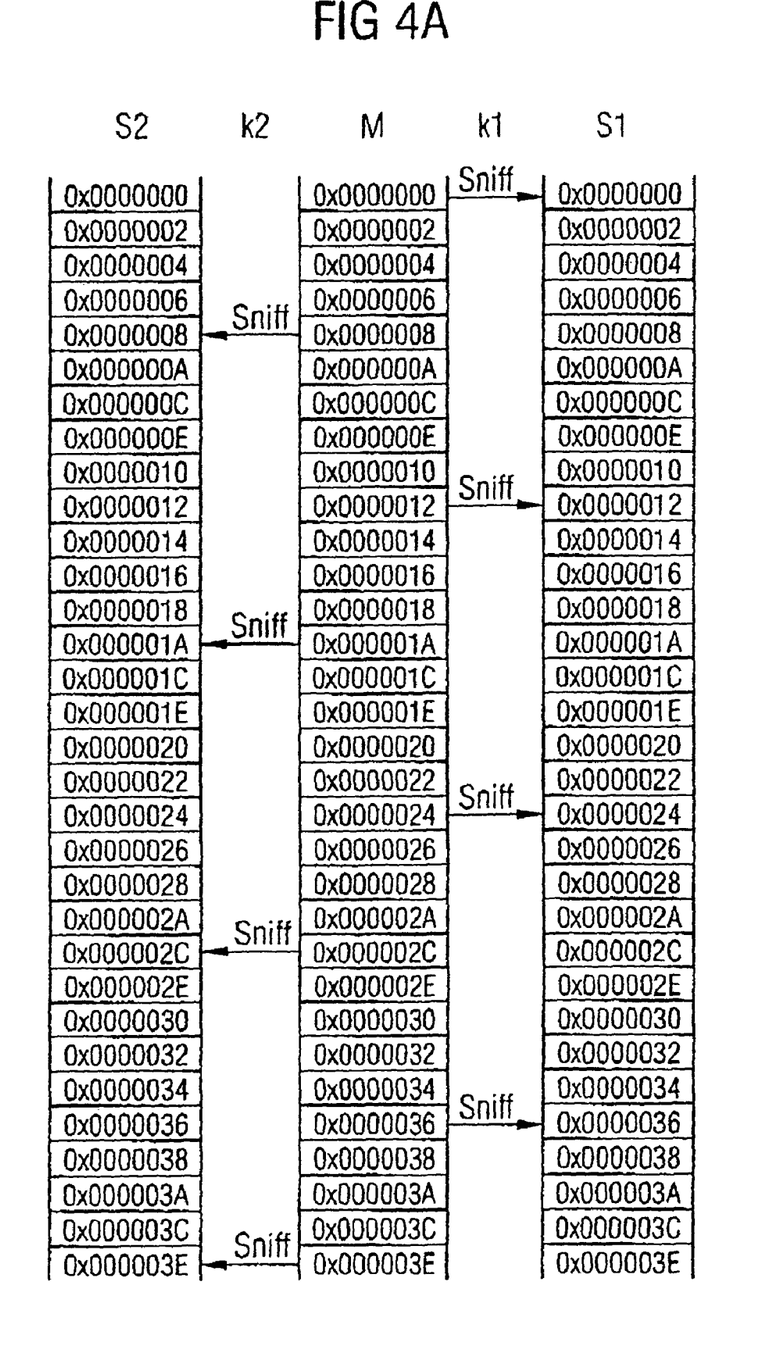
FIG. 4 uses a schematic illustration to show a first exemplary embodiment of data transmission according to the invention between a master subscriber and two slave subscribers.

A further exemplary embodiment will be described with reference to the cell grid in FIG. 4, in order to describe the method according to the invention. With regard to the two already existing links K1, K2 from the master subscriber M to the slave subscribers S1, S2, HCI commands are now used to stipulate that the sniff mode should be activated for these links K1, K2. This could lead to the slots within the frame grid being filled as shown in FIG. 4A. However, filling such as this is not always advantageous, for example when the power consumption of the master subscriber M is significant. Particularly for reasons relating to more effective power consumption, it could be advantageous for the two links K1, K2 to the slave subscribers S1, S2 either to be superimposed or to be operated at least adjacent to one another, such that the data interchange between the master subscriber M and the respective other slave subscriber S2 takes place immediately after a data interchange between the master subscriber M and a slave subscriber S1.

Figure 4B:
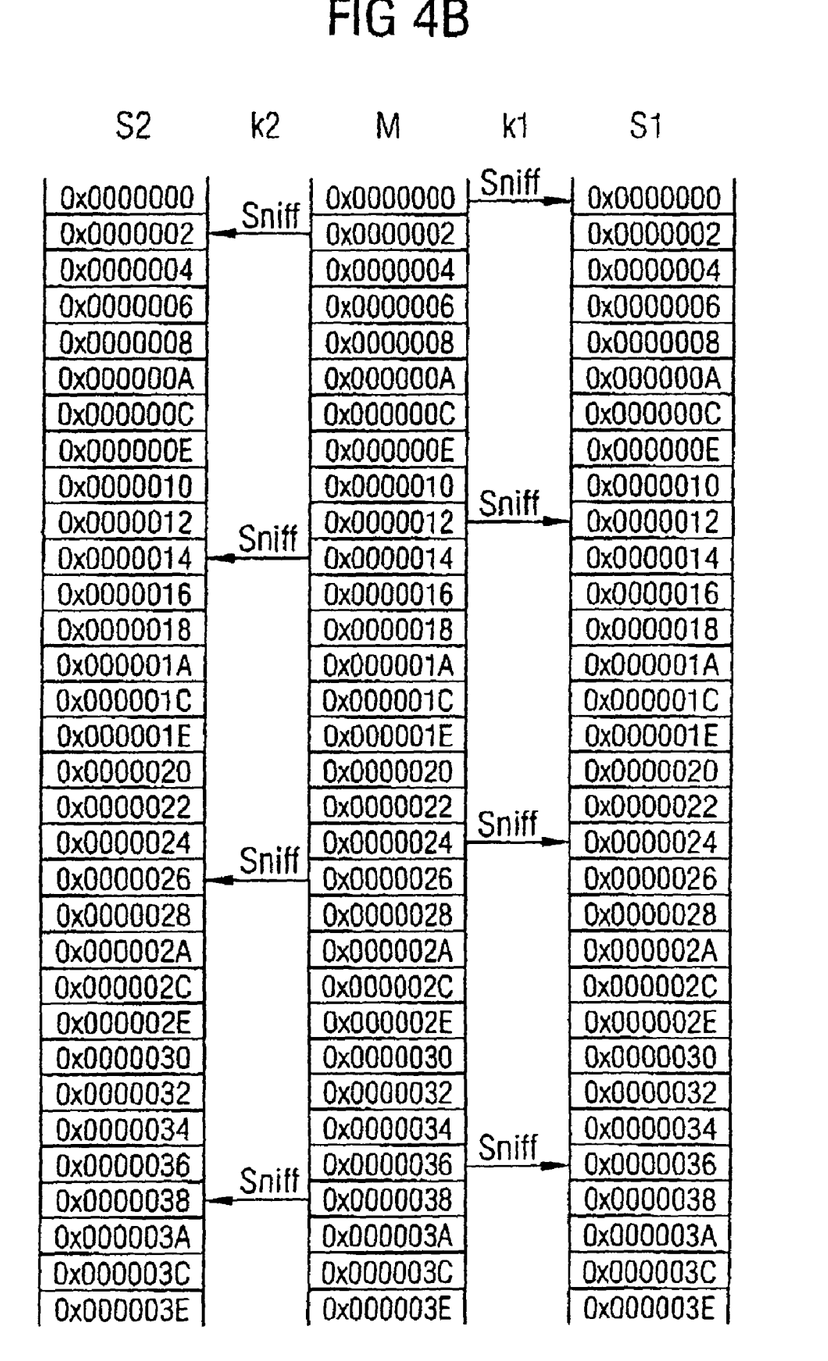

A configuration such as this would lead to the frames within the frame grid being filled as shown in FIG. 4B. The longer pause between the active phases, during which data is interchanged between the master subscriber M and the slave subscribers S1, S2, can be used very much more efficiently for power saving measures when filled as shown in FIG. 4B. The method according to the invention thus makes it possible to stipulate when the active phases are provided between the master subscriber and the slave subscribers S1, S2 relative to one another—within the degree of freedom that exists for this purpose.

Figure 5A:
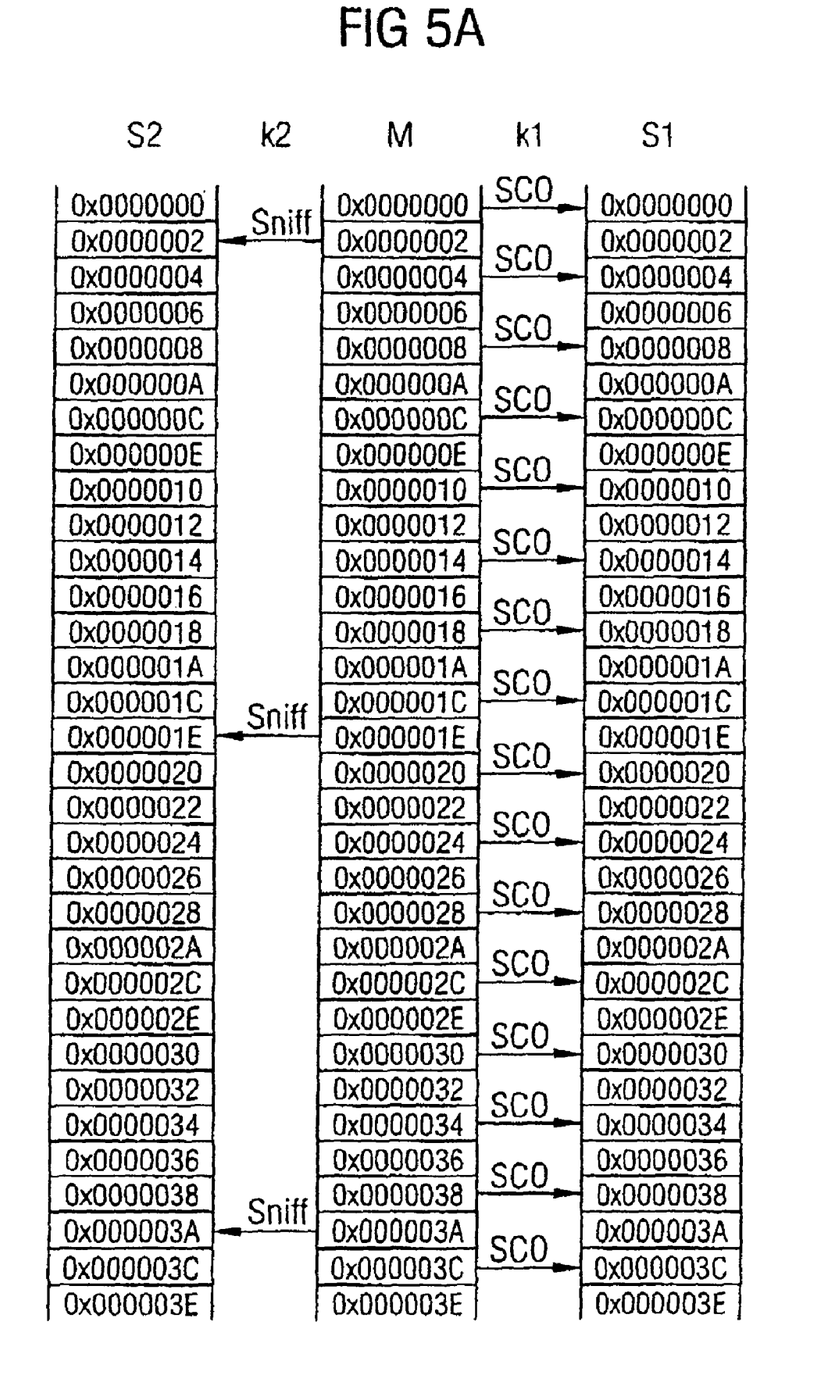
FIG. 5 uses a schematic illustration to show a second exemplary embodiment of data transmission according to the invention between a master subscriber and two slave subscribers.

FIG. 5A shows a further exemplary embodiment in order to illustrate the method according to the invention. In this exemplary embodiment, an SCO link K1 with the parameter $T_{SCO}=4$ already exists between the master subscriber M and the slave subscriber S1. Furthermore, the master subscriber M decides that the sniff mode should be activated for the existing ACL link K2 to the slave subscriber S2. The aim in this case is to ensure that the link K2 that is in the sniff mode is used at least once in every 14th frame, that is to say $T_{Sniff}=28$ slots.

Since, as has already been mentioned above, the SCO link K1 for interchanging data is always given priority over a link in the sniff mode, it is also necessary to ensure that data interchange also always takes place for the second link K2, which is operated in the sniff mode.

The method according to the invention makes it possible to delay the time interval, $D_{Sniff\,2}$ such that the frames for the slave subscriber S2 are always allocated whenever no data is being interchanged between the master subscriber M and the slave subscriber S1. This can be achieved very easily by insertion of the delay $\delta$.

Such deliberate synchronization is impossible with the known methods. In principle, there are two different possible ways to achieve the same functionality as that shown in FIG. 5A:

Firstly, two adjacent frames could in this case each be allocated for data interchange for the second link K2, which will make it possible to ensure that data interchange would take place at least in one of these frames. No data interchange would take place in the respective other frame, since an allocated frame for the first subscriber S1 would be superimposed on it and, owing to the prioritization of an SCO link, no data interchange would take place here (see FIG. 5B).

A further possibility would be to shorten the period $T_{Sniff}$ such that there is no need to define the parameter $N_{Attempt}=2$ and only one frame in each sniff period is reserved for the sniff mode. This can be achieved by halving the sniff period from 28 slots to 14 slots. In this case, every alternate sniff frame admittedly has the first SCO link superimposed on it and can therefore no longer be used for the sniff mode, but halving the sniff period $T_{Sniff}=14$ slots ensures that data interchange takes place at least in every fourteenth frame—which corresponds to the original interval (see FIG. 5C).

Figure 5B:
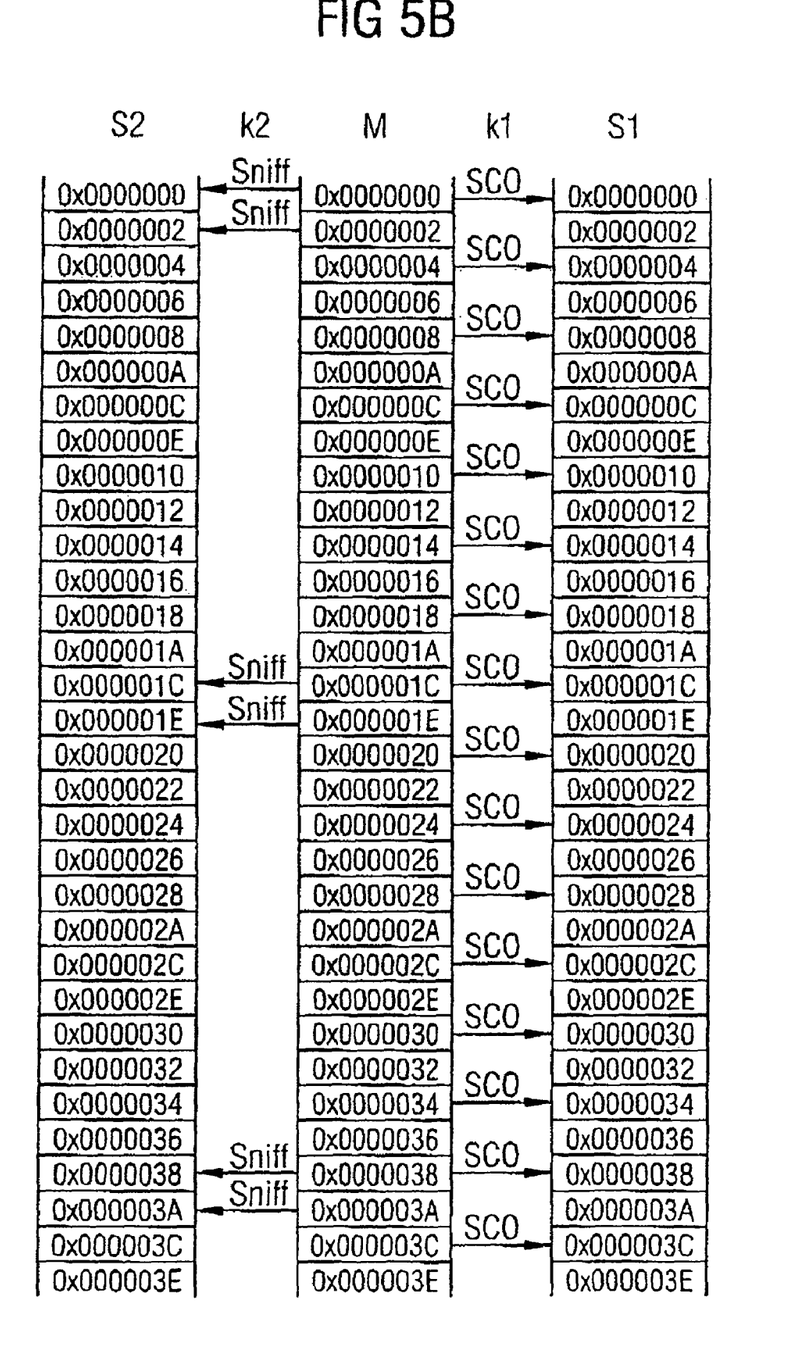
Figure 5C:
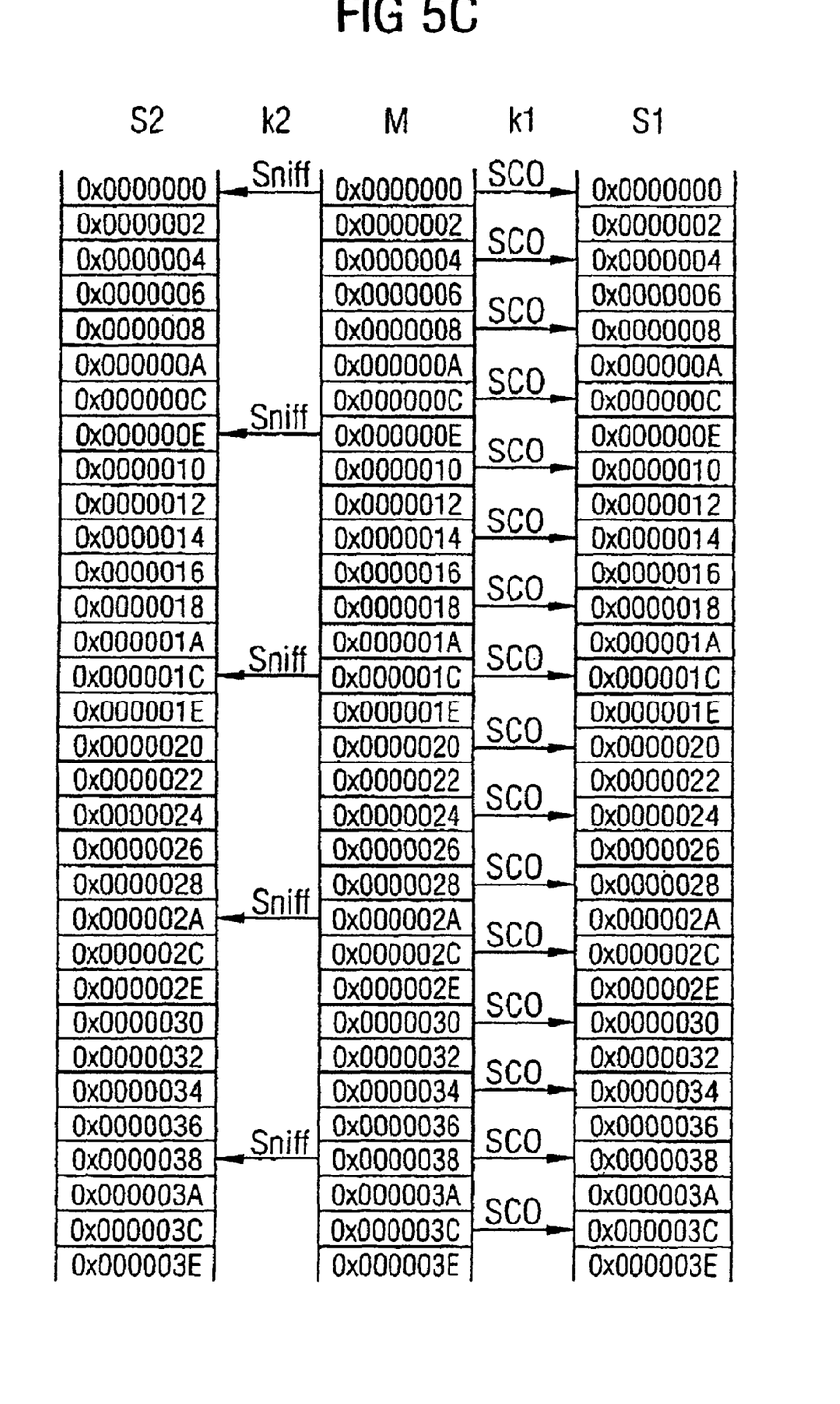

In the case of the solution according to the invention shown in FIG. 5A, and in contrast to the previously known solutions shown in FIGS. 5B, 5C, the number of frames which are reserved for the sniff mode can be reduced in the event of a demand such as this for the links K1, K2 between the master subscriber M and the slave subscribers S1, S2. Overall, this could lead to a saving in the power consumption of the subscribers M, S1, S2 that are in each case involved and, furthermore, to more efficient utilization of the available bandwidth.

The invention has been explained with the exemplary embodiments above on the basis of a communication system on which data has been interchanged between a master subscriber and two slave subscribers. However, the invention is not restricted to this particular configuration but may, of course, also be extended to the interchange of data between a master subscriber and any desired number of slave subscribers—within the scope of the respective degrees of freedom. Furthermore, the invention has been described above with reference to SCO data links and links operated in the sniff mode. However, the invention is not restricted to this but may, for example, also be extended to any other operating modes—for example a park mode, hold mode, etc—and to types of link which can be operated with any desired permutations with respect to one another.

The invention has also been described above with reference to a communication system based on the Bluetooth standard. However, the invention is not restricted to this but, in general, allows an improvement to the interchange of data in comparable systems that are operated using the timeslot method.

In summary, it can therefore be stated that the method according to the invention makes it possible to make better use of the degrees of freedom which are inherent to the communication system of interchanging data, in a highly elegant manner, simply by insertion of a single constant which can be predetermined by the respective user.

The present invention has been explained with reference to the above description in order to clarify as well as possible the principle of the method according to the invention and its practical application, although the invention may, of course, be implemented in many variations, in a suitably modified form.

What is claimed is:

1. Method for data transmission, in particular on the basis of the Bluetooth standard, in which data packets can be interchanged by radio by using time slots, the method comprising:
   establishing a first communication channel between a master subscriber and a first slave subscriber;
   operating the first communication channel to perform data exchange during a first time slot followed by a first subsequent time slot in which no data exchange occurs;
   establishing a second communication channel between the master subscriber and a second slave subscriber;
   operating the second communication channel to perform data exchange during a second time slot followed by a second subsequent time slot in which no data exchange occurs, operating the second communication channel including synchronizing the second communication channel to the first communication channel;
   wherein synchronizing the second communication channel includes causing data exchange during a specified time slot, the specified time slot determined based upon a time slot in which data exchange occurs in the first communication channel; and
   determining a synchronization parameter for synchronization of the second communication channel, the synchronization parameter defining a phase offset between a first data interchange and a second data interchange, the first data interchange between the master subscriber and the first slave subscriber via the first communication channel and the second data interchange between the master subscriber and the second slave subscriber via the second communication channel.

2. The method according to claim 1 further comprising operating the first communication channel in one of the group consisting of a sniff mode and a park mode.

3. The method according to claim 2, characterized in that at least one of the group consisting of the first communication channel and the second communication channel includes an Asynchronous Connectionless (ACL) data link which is operated in at least one of the group consisting of the sniff mode and the park mode.

4. The method according to claim 1, characterized in that at least one of the group consisting of the first communication channel and the second communication channel includes a Synchronous Connection Oriented (SCO) data link, with a time interval of $T_{SCO}=4$ time_slots or $T_{SCO}=6$ time slots.

5. The method according to claim 1, wherein first time slot and the second time slot at least partially overlap.

6. The method according to claim 1, wherein the first time slot in the first communication channel is immediately adjacent in time to the second time slot in the second communication channel.

7. The method according to claim 1, wherein:
   a period of the first communication channel is an integer multiple of a period of an SCO communication channel operating in a first mode, the period the SCO communication channel being one of the group consisting of four time slots and six time slots.

8. The method according to claim 1, wherein:
   a period of the second communication channel is an integer multiple of a period of the first communication channel.

9. The method according to claim 1, further comprising:
   counting the number of zero crossings which have occurred since the establishment of the first communication channel for synchronization purposes; and setting up the second communication channel using the counted number to determine the phase offset with respect to the first communication channel.

10. The method according to claim 1 wherein slot-based data interchange takes place between the master subscriber and the first and second slave subscribers.

11. The method according to claim 1 wherein frame-based data interchange takes place between the master subscriber and the first and second slave subscribers.

12. The method according to claim 1 wherein synchronizing the second communication channel further comprises:
employing a programmable unit, to synchronize the second communication channel.

13. The method of claim 1, wherein the synchronization parameter defining the phase offset represents a phase offset that is referenced from the first communication channel.

14. A data transmission system which is based on the Bluetooth standard, comprising:
a master subscriber;
first and second slave subscribers operable to communicate data packets with the master subscriber by radio using time slots;
a first communication channel providing data interchange between the master subscriber and the first slave subscriber;
a second communication channel providing data interchange between the master subscriber and the second slave subscriber, the second communication channel performing data exchange during a specified time slot, the specified time slot determined based upon a time slot in which data exchange occurs in the first communication channel;
a control device operable to control a setting up of the first and second communication channels as well as a timing of the data interchange between the master subscriber and each of the first and second slave subscribers, the control device being configured to determine synchronization parameters for synchronization of the second communication channel, the synchronization parameters defining a phase offset between a first data interchange and a second data interchange, the first data interchange between the master subscriber and the first slave subscriber via the fist communication channel and the second data interchange between the master subscriber and the second slave subscriber via the second communication channel.

15. The data transmission system according to claim 14, further comprising a maximum of five additional slave subscribers, and wherein the master subscriber, the first slave subscriber, the second slave subscriber and the additional slave subscribers are simultaneously actively involved in the data interchange.

16. The data transmission system according to claim 14, wherein the master subscriber and at least one slave subscriber can be operated in an operating mode in which data is interchanged periodically in first time slots and no data is interchanged in adjacent second time slots.

17. The data transmission system according to one of claim 14, wherein the data transmission system includes a cordless digital communication system.

18. The data transmission system according to claim 14, wherein the control device comprises a link manager.

19. The data transmission system according to claim 14, wherein the control device includes a programmable unit.

* * * * *